United States Patent [19]
Gerges et al.

[11] 4,099,023
[45] Jul. 4, 1978

[54] METHOD FOR THE REGULATION OF THE PHASE OF A TIMING SIGNAL IN A DATA TRANSMISSION SYSTEM

[75] Inventors: André Gerges, Munich; Joachim Siglow, Wolfratshausen, both of Germany

[73] Assignee: Siemens Aktiengesellschaft, Munich, Germany

[21] Appl. No.: 740,764

[22] Filed: Nov. 10, 1976

[30] Foreign Application Priority Data

Nov. 14, 1975 [DE] Fed. Rep. of Germany ....... 2551243

[51] Int. Cl.² .............................................. H04L 7/00
[52] U.S. Cl. ................................................. 178/69.1
[58] Field of Search .................... 178/68, 69.1, 88, 53; 179/15 BS; 325/38 A, 418, 419; 328/55, 56; 340/146.1 D

[56] References Cited

U.S. PATENT DOCUMENTS

| | | | |
|---|---|---|---|
| 3,057,962 | 10/1962 | Mann et al. | 178/69.1 |
| 3,716,851 | 2/1973 | Neumann | 340/146.1 D |
| 3,806,647 | 4/1974 | Dohne et al. | 340/146.1 D |

Primary Examiner—Benedict V. Safourek
Attorney, Agent, or Firm—Schuyler, Birch, Swindler, McKie & Beckett

[57] ABSTRACT

A method is described for phase regulating a received timing signal in a data transmission system wherein the transmissions contain partial response pulses. In a receiver the composite transmitted signal is reproduced, and it generally differs from certain given values. A sampling signal having amplitudes indicating these differences is produced. The sampling signal is multiplied by a factor signal to produce a multiplicative signal. The latter is integrated to produce a regulating signal used for making the aforementioned phase adjustment.

2 Claims, 11 Drawing Figures

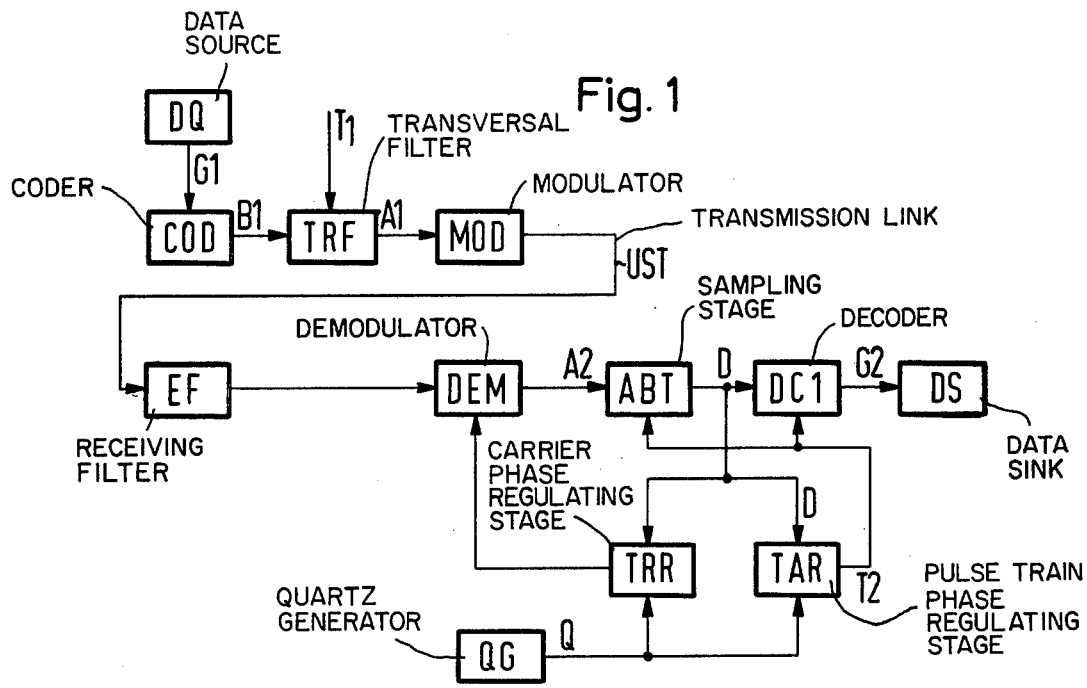
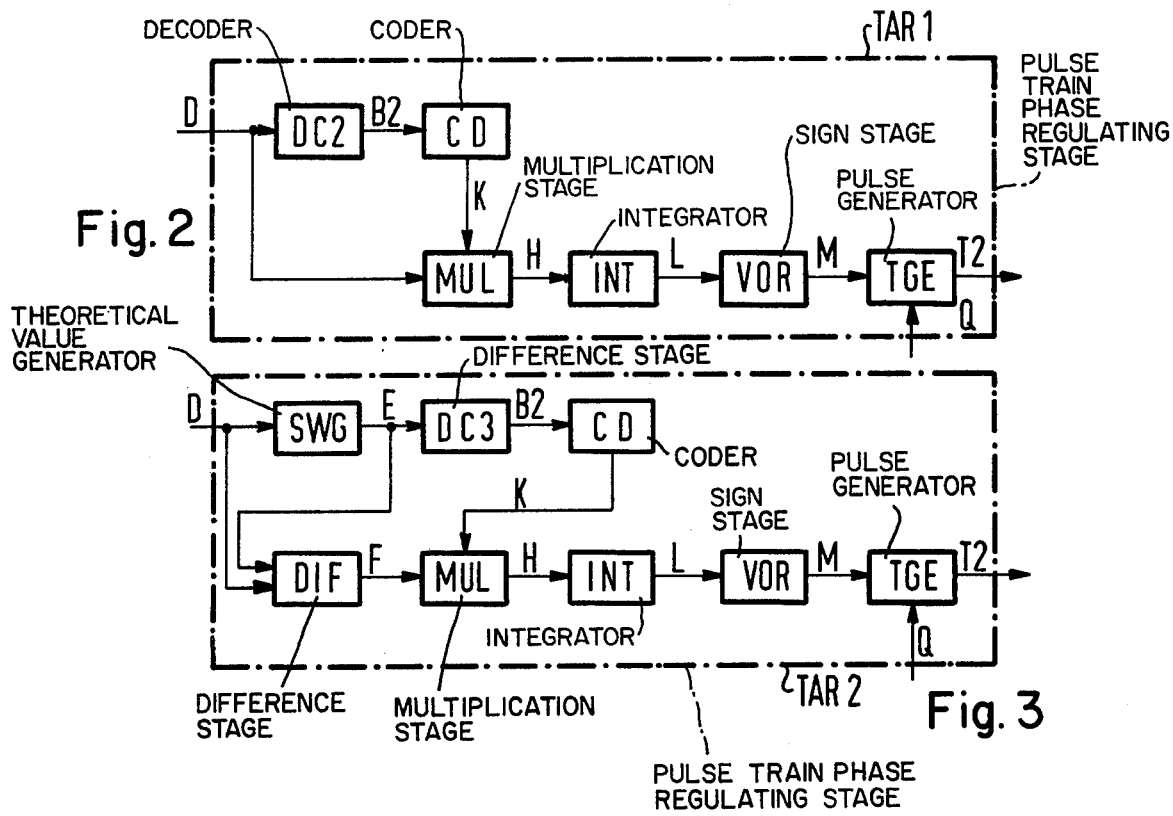

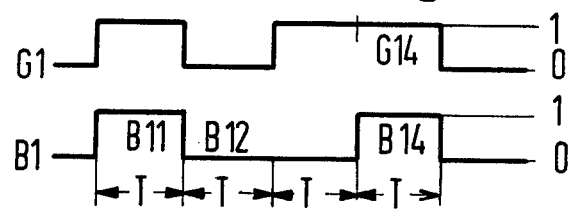
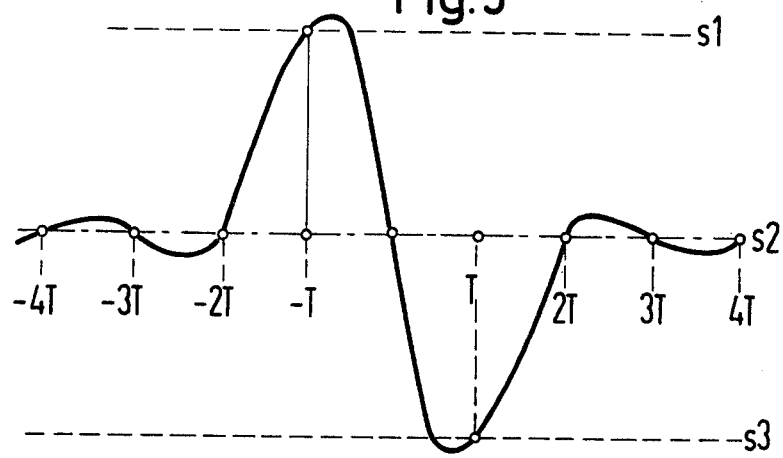
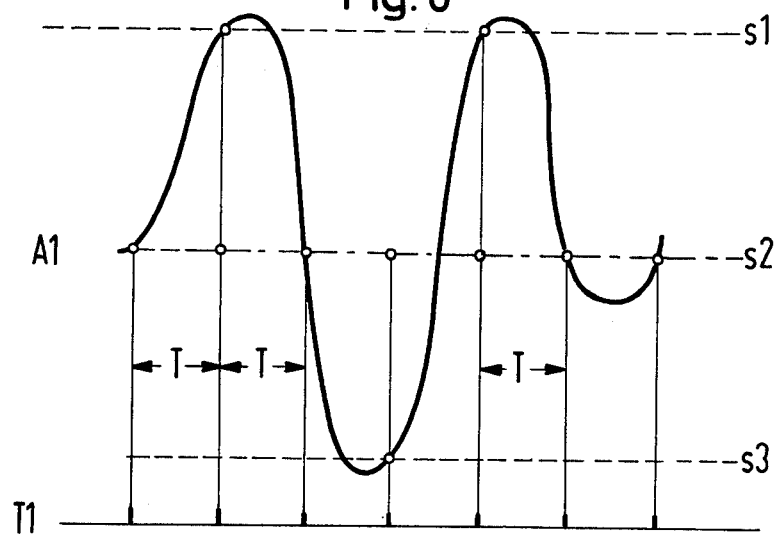

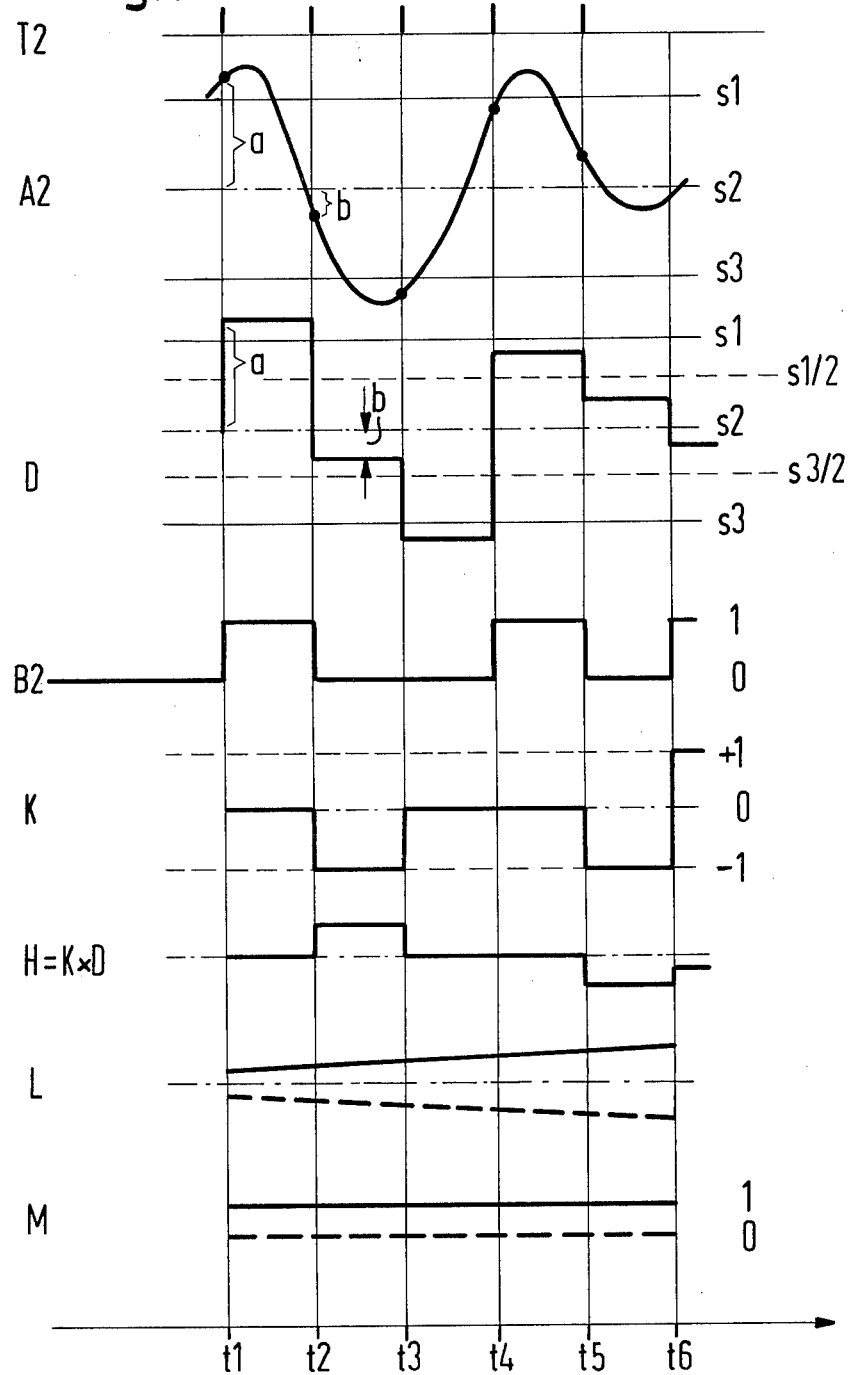

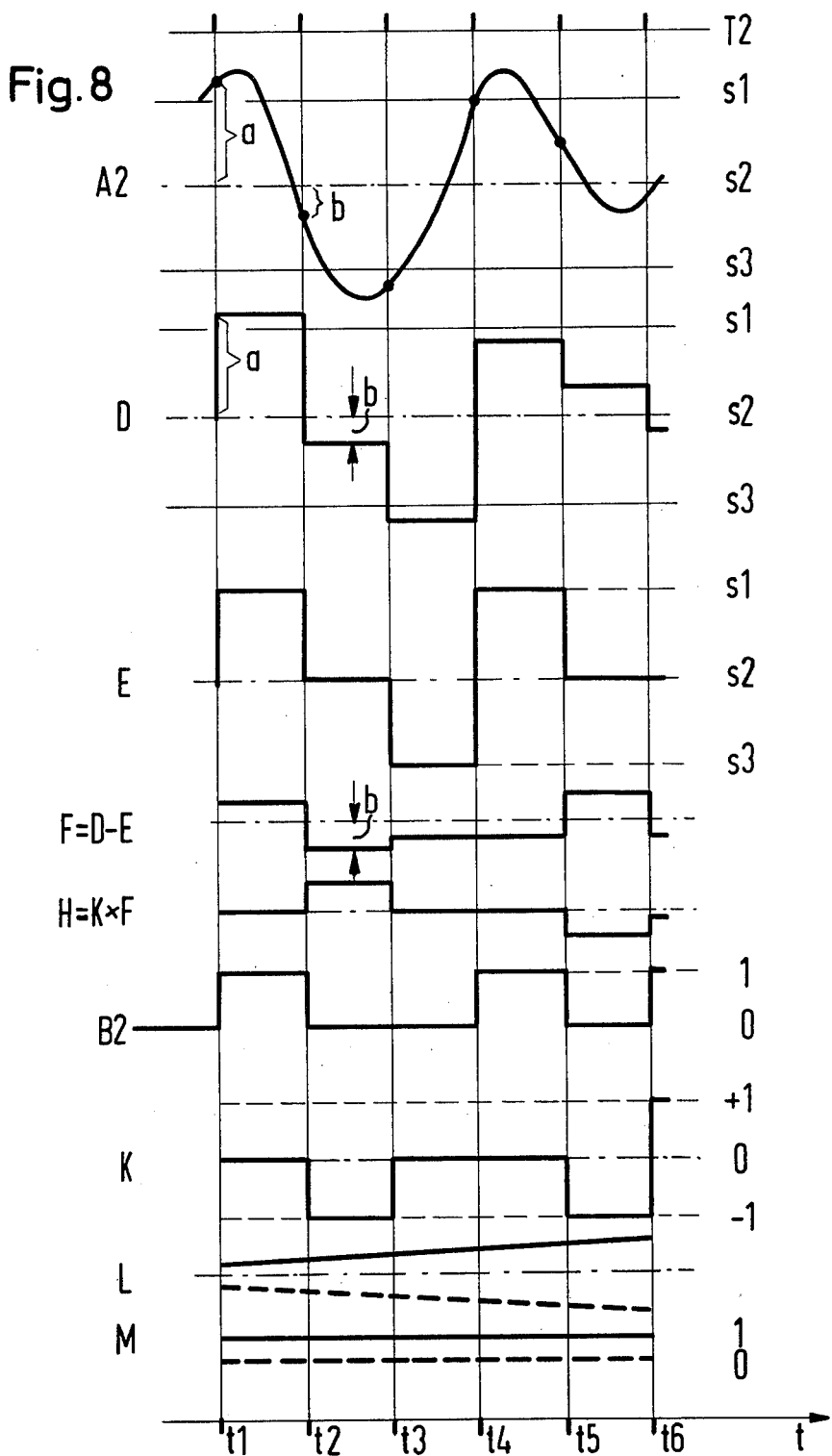

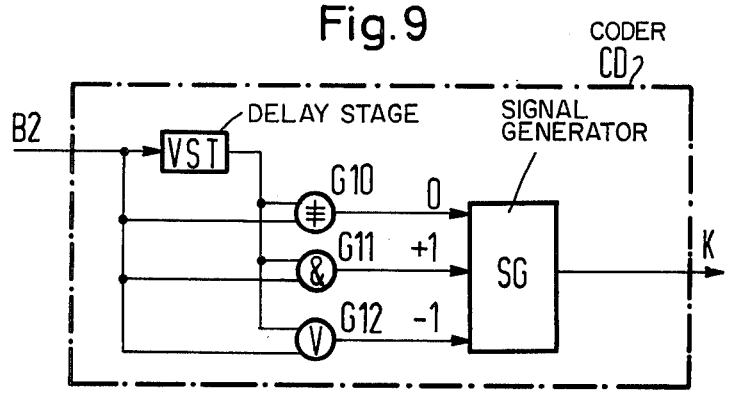
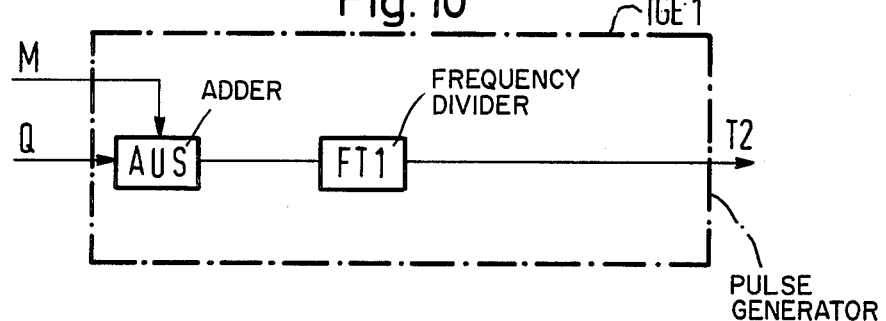
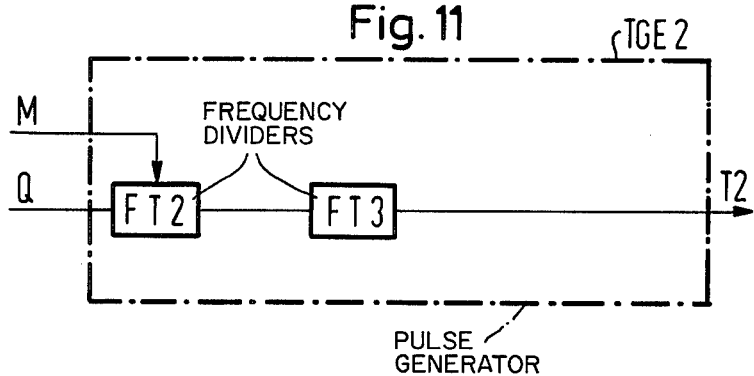

METHOD FOR THE REGULATION OF THE PHASE OF A TIMING SIGNAL IN A DATA TRANSMISSION SYSTEM

BACKGROUND OF THE INVENTION

The invention relates to a method of regulating the phase of a received timing signal in data transmissions, particularly transmissions containing partial response pulses.

In accordance with German Auslegeschreft No. 2,212,917 it is know to regain the receiving pulse train phase in data transmission devices using an adaptive distortion corrector. Known adaptive distortion correctors of this type are complex and expensive and, therefore, are undesirable.

An object of the invention is to provide a method for regaining the pulse train from a transmitted data signal in a manner which does not require adaptive distortion correcters.

SUMMARY OF THE INVENTION

The foregoing and other objects are realized by producing a factor signal having amplitudes corresponding to values 0, −1 and +1, when the two binary values, displaced by two pulse train periods, of the receiving-end data signal differ, and when they assume their second binary value, respectively. The signal amplitudes of the factor signal are multiplied by the sampling signal to produce a multiplicative signal. This multiplicative signal is integrated, and the integrated multiplicative signal thus formed serves as regulating signal.

The method in accordance with the invention is particularly advantageous in that it does not require an adaptive distortion correcter for its execution.

Another advantage of the method of the invention consists in that the pulse train phase regulation finds the optimum pulse train phase independently of a possible carrier phase error in the demodulation of the receiving-end signal mixture. This property ensures a stable cooperation of carrier and pulse train-phase regulation, in particular when the carrier phase is regulated in dependence upon the pulse train phase.

Another advantage of the method of the invention consists in that the pulse train phase regulation finds the optimum pulse train phase independently of the amplitude of the composite signal containing partial response pulses. As a result of this property, no special demands need be made on the accuracy of a receiving level regulation.

Another advantage of the method of the invention consists in that signal distortions on the transmission path have only a slight influence on the pulse train phase regulation. This is because the data signal is analyzed in a range which is virtually uninfluenced by distortions.

For the execution of the method of the invention, it is advantageous to provide a coder with a delay stage which receives the receiving-end coded data signal. The output and the input of this delay stage are connected to two inputs of a logic circuit which in the event of unequal binary values at the inputs of the logic circuit emits a control signal to set the factor signal to the amplitude value 0, and in the event of equal binary values at the inputs of the logic circuit emits a control signal to set the two other amplitude stages to the values +1 and −1 of the factor signal.

In a preferred exemplary embodiment of a circuit arrangement for the execution of the method of the invention, a multiplication stage is provided which receives the factor signal and the sampling signal and which emits a resulting multiplicative signal. Also the input of an integrator is connected to the output of the multiplication stage, and the integrator emits an integrated, multiplicative signal. Using this integrated, multiplicative signal, it is possible to carry out the pulse train phase regulation either in digital fashion or in analog fashion.

BRIEF DESCRIPTION OF THE DRAWINGS

FIG. 1 is a block circuit diagram of a data transmission system,

FIG. 2 is a block schematic diagram of a first exemplary embodiment of the pulse train phase regulating stage schematically illustrated in FIG. 1.

FIG. 3 is a block schematic diagram of a second exemplary embodiment of the pulse train phase regulating stage schematically illustrated in FIG. 1.

FIG. 4 contains time-waveform diagrams showing a data signal and a coded data signal.

FIG. 5 is a time-waveform diagram illustrating an individual partial response pulse of Class IV.

FIG. 6 is a time-waveform diagram illustrating a transmitting-end composite signal consisting of a plurality of partial response pulses.

FIGS. 7 and 8 are time-waveform diagrams showing a plurality of signals which are of significance in association with the pulse train phase regulation.

FIG. 9 is a block schematic diagram illustrating an exemplary embodiment of a coder used in connnection with the FIGS. 2 and 3 embodiments.

FIG. 10 is a block schematic diagram of a first exemplary embodiment of a pulse generator.

FIG. 11 is a block schematic diagram of a second exemplary embodiment of a pulse generator.

DETAILED DESCRIPTION OF THE DRAWINGS

In FIG. 1 is illustrated a data transmission system having at the transmitting end, a data source DQ, a coder COD, a transversal filter TRF, and a modulator MOD. The data source DQ emits a data signal G1, as illustrated in FIG. 4. The binary values of this signal and other binary signals are referenced 0 and 1. For the pulse train phase regulation which will be described in the following it is advantageous for an approximately equal number of 1-values and 0-values of the data signal G1 to occur within given, equal lengths of time. In the exemplary embodiments which will be described making reference to the following Figures, it is therefore assumed that approximately equal numbers of 1-values and 0-values of the signal G1 occur in given time ranges. Sequences of data which do not fulfill this condition can, as is known, be recoded without data loss in such manner that the recorded items of data contain approximately equal numbers of 1-values and 0-values in equal time intervals. Recoding of this type is assumed to be known per se and and therefore will not be discussed in detail here.

The coder COD effects a pre-coding, in accordance with which each binary value of the signal B1 is formed from the modulo-2-sum of the simultaneously occurring binary value of the signal G1 and a binary value of the signal B1 which occurred two pulse train periods T earlier. For example the binary value B14=1 (FIG. 4) is equal to the modulo-2-sum of the binary value G14=1 and the binary value B12=0 of the signal B1 which occurred two pulse train periods T earlier.

Using transversal filter TRF in the FIG. 1 embodiment, each 1-value of the signal B1 is assigned a partial response pulse, as illustrated in FIG. 5, and each 0-value of the signal B1 is not assigned a partial response pulse. Thus in this exemplary embodiment the binary values B11 and B14 are assigned partial response pulses which when superimposed result in the signal mixture A1 illustrated in FIG. 6. The latter can assume three different theoretical values at the sampling times, and in fact the positive theoretical value s1, the negative theoretical value s3, and the mean theoretical value s2, where the value 0 corresponds to the theoretical value s2, and the equation s3 = s1 applies to s1 and s3. The transversal filter TRF emits this signal mixture A1 to the modulator MOD, and by means of amplitude modulation and single side-band transmission, a corresponding signal is transmitted via the transmission link UST to a receiver.

At the receiving end are connected in the illustrated manner a receiving filter EF, a demodulator DEM, a sampling stage ABT, a decoder DC1, a carrier phase regulating stage TRR, a pulse train phase regulating stage TAR and a quartz generator QG. The demodulator DEM demodulates the received signal producing composite signal A2 which corresponds to the transmitted composite signal A1. In the ideal situation when no distortions, amplitude errors and carrier phase errors occur in the demodulation, the composite signal valves A1 and A2 would be equal to one another. Composite signal A2 is illustrated in FIG. 7. It is to be noted that the scales on which FIGS. 6 and 7 are based differ from one another.

In the sample stage ABT illustrated in FIG. 1, the composite signal A2 is sampled at the sampling times governed by the timing signal T2. Generally speaking the phase state of the receiving-end timing signal T2, relative to the received composite signal A2, is not identical to the phase state of the transmitting-end timing signal T1 illustrated in FIG. 6, relative to the transmitted composite signal A1. The timing signal T2 thus generally exhibits a phase error which is to be compensated in the course of the phase regulation which is here being described.

In the course of the sampling of the composite signal A2, a signal D is obtained from the sampling stage ABT. The amplitudes of the composite signal A2 which are determined at the sampling times are stored until the next sampling time during a pulse train period T. For example at the sampling time t1 entered in the lower part of FIG. 7, the amplitude a of the composite signal A2 is determined and stored in the form of signal D until the next sampling time t2.

The signal D is supplied to the decoder DC1 illustrated in FIG. 1 and which emits the signal G2, the latter signal in normal transmission is identical to the signal G1 illustrated in FIG. 4. The decoder DC1 thus cancels the coding which was effected by the coder COD and the transversal filter TRF.

FIG. 2 illustrates a pulse train phase regulating stage TAR1 which can be used as a first exemplary embodiment of the pulse train phase regulating stage TAR shown in FIG. 1. The pulse train phase regulating stage TAR1 contains a decoder DC2, a coder CD, a multiplication stage MUL, an integrator INT, a sign stage VOR and a pulse generator TGE.

The decoder DC2 receives the signal D and emits a signal B2 which is likewise illustrated in FIG. 7. The mode of operation of this decoder DC2 can be seen from Table 1. In the top row of Table 1 the bracketed expressions relate to the sampling time $n$ and to the sampling time $n$-2 which occurred two pulse train periods T earlier. The signal B2($n$) at the time $n$ is dependent at the time $n$-2. At the time $t1$, the amplitude of the signal D is more positive than half the positive theoretical value $s1$. The latter is entered in FIG. 7 being referenced $s1/2$. It is also assumed that the signal B2 has the value 0 two pulse train periods earlier. Under these conditions the value 1 is obtained for the signal B2 at the time $t1$. At the time $t3$, the amplitude of the signal D is more negative than half the negative theoretical value $s3$. The latter is entered as $s3/2$ in FIG. 7. Two pulse train periods previously the signal B2 has the value 1, so that the signal B2 has the value 0 at the time $t3$.

Table 1

| D(n) | B2(n−2) | B2(n) |
|---|---|---|
| More positive than s1/2 | 0 | 1 |
| More negative than s3/2 | 1 | 0 |
| Between s1/2 and s3/2 | 1 | 1 |
| Between s1/2 and s3/2 | 0 | 0 |

In the case of fault-free transmission, the signal B2 is identical to the transmitting-end signal B1. Thus the coder DC2 cancels the coding which was effected at the transmitting end by the transversal filter.

Table 2

| B2(n) | B2(n−2) | K(n) |
|---|---|---|
| 0 | 0 | −1 |
| 0 | 1 | 0 |
| 1 | 0 | 0 |
| 1 | 1 | +1 |

The signal B2 is fed to the coder CD which operates in accordance with Table 2 to emit the signal K. In the top line of Table 2 the expression B2($n$) related to the signal B2 at the time $n$, the expression B2($n$-2) relates to the signal B2 at the time $n$-2, and the expression K($n$) relates to the signal K at the time $n$. The information in Table 2 can be expressed by the following equation:

$$K(n) = B2(n) + B2(n-2) - 1$$

where B2($n$) and B2($n$−2) can assume the values 0 and 1. The signal K illustrated in FIG. 7 can be derived in accordance with Table 2 or in accordance with the above equation. For example, at the sampling time $t4$, B2($n$) = 1, B2($n$−2) = 0 and therefore K($n$) = 0.

Multiplication stage MUL multiplies the signal amplitudes of the signals D and K, producing signal H. With K=0, the result is H=0. Thus in this case no part of the signal D is transferred. With the signal K = +1, a part of the signal D with the same polarity is transferred as the signal H, and with the signal K = −1 a part of the signal D with the opposite polarity is transferred as the signal H. This is seen differently from the point of view of the signal B2. When the binary values, displaced by two pulse train periods T, of the signal B2 are unequal, it is always true that the signal K=0, and no part of the signal D is transformed into the multiplicative signal H. When the two binary values, displaced by two pulse train periods T, of the signal B2 both assume their value 0, the result is the signal K = −1, and a part of the signal D with opposite polarity is transformed into the signal H. When the two binary values of signal B2, displaced by two pulse train periods T, assume their value 1, a part of the signal D with the same polarity is transformed into the signal H. A further influence on signal H to influence the pulse train phase regulation may be made whenever two binary values of signal B2, displaced by two pulse train periods, differ from one another. In this case no parts of the signal D which could influence the pulse train phase regulation are taken into account. In contrast, however, the pulse train phase regulation is influenced whenever the two binary values of the signal B2, displaced by two pulse train periods, both assume either the values 0 or the values 1.

In FIG. 7 the positive theoretical amplitude $s1$, the negative theoretical amplitude $s3$ and the mean theoretical amplitude $s2$ have been entered for the signal A2. The amplitudes of the signal A2 at the sampling times $t1, t2, t3, t4, t5, t6$ are generally not equal to these theoretical amplitudes $s1, s2, s3$. For example, the amplitude $a$ of the signal A2 differs from the positive theoretical amplitude $s1$ at the time $t1$. However, the amplitudes of the signal D which lie in the region of the positive theoretical value $s1$ and in the region of the negative theoretical value $s3$ play no part in the production of the signal H, as these amplitudes are assigned the value 0 of the signal K. so that in the subsequent product formation these amplitudes of the signal D are not taken into account. However it is an essential factor that the deviation of the amplitude $b$ of the composite signal A2 from the mean theoretical amplitude $s2$ is indicated with the signal D. For example, the signal D from the time $t2$ until the time $t3$ serves to indicate the deviation $b$ of the signal A2 at the time $t2$ from the mean theoretical amplitude $s2$.

The signal H is coupled to integrator INT, as illustrated in FIG. 2. The integration time is to be a multiple $mT$ of the pulse train period T. Thus the integrator INT is periodically reset at time intervals $mT$. But, shortly before resetting, it is interrogated, and the sign of the signal emitted by the integrator INT is determined. It has already been mentioned that it would be favorable for the data source DQ illustrated in FIG. 1 to emit a signal G1 which possesses an approximately equal number of 1-values and 0-values at the same times. Under such conditions, the integration time of the integrator INT should also be sufficiently long for an approximately equal number of 1-values and 0-values of signal G1 to occur within this period of time. It has been proved that the integration time of the integrator should at least be equal to 20 times the pulse train period T, and that it is particularly advantageous for the integration time to be equal to or greater than 64 times the pulse train period T.

The integrator INT emits the signal L which can either be positive or negative. This signal L is coupled to the sign stage VOR which emits the binary signal M whose binary values 1 and 0 characterize, respectively, the positive and negative polarities of the signal L.

Pulse generator TGE produces timing signal T2 illustrated in FIG. 7. The phase state of this timing signal T2 is controlled by the signal M to the extent that the signal M=0 effects a delay of the phase and the signal M=1 effects an acceleration of the phase, this phase regulation preferably being effected in samll steps and in fact in time intervals $mT$.

FIG. 3 illustrates a pluse train phase regulating stage TAR2 which can be used in place of the pulse train phase regulating stage TAR1 in connection with the FIG. 1 embodiment. The stage TAR2 additionally contains the theoretical value generator SWG and the difference stage DIF. The mode of operation of the pulse train phase regulating stage TAR2 will now be explained making reference to the signals shown in FIG. 8. The upper part of FIG. 8 shows the signals T2, A2 and D which have already been discussed in detail with reference to FIG. 7. A theoretical value generator SWG receives the signal D whose amplitudes do not conform with the theoretical amplitudes $s1, s2$ and $s3$ entered in FIG. 8. In the theoretical value generator SWG the theoretical value signal E is produced so that its amplitudes always assume that one of the theoretical amplitudes $s1, s2, s3$ which is closest to the amplitude of the signal D, and therefore is the most probable.

In difference stage DIF a difference signal corresponding to the difference between the amplitudes of the signals D and E is formed, so that the signal F is formed which can be considered as an error signal. The zero lines of the signals D and E which are to be subtracted, and of the signal F are shown in dash-dotted fashion.

Table 3

| E(n) | B2(n−2) | B2(n) |
|------|---------|-------|
| s1   | 0       | 1     |
| s3   | 1       | 0     |
| s2   | 1       | 1     |
| s2   | 0       | 0     |

The decoder DC3 contains the signal E and emits the signal B2 which is likewise illustrated in FIG. 8. The mode of operation of this decoder DC3 can be seen from Table 3. In the top line of Table 3 the bracketed expressions refer to the sampling time $n$, and to the sampling time $n$-2 which occurred two pulse train periods earlier. The signal B2($n$) at the time $n$ is dependent upon the signal E($n$) at the time $n$ and upon the signal B2($n$-2) at the time $n$-2. At the time $t1$, the signal E has the amplitude $s2$. It is also assumed that the signal B2 has the value 0 two pulse train periods earlier. Under these conditions, the signal B2 obtains the value 1 at the time $t1$. At the time $t3$, the signal E has the amplitude $s3$. Two pulse train periods earlier the signal B2 has the value 1, so that the signal B2 has the value 0 and the time $t3$. With fault-free transmission the signal B2 is identical to the transmitting-end signal B1. The decoder DC3 cancels the coding which was effected at the transmitting end by the transversal filter TRF. The signals B2 represented in FIGS. 7 and 8 are identical to one another.

The production of the signal K has already been explained making reference to FIG. 7 and Table 2. The multiplication stage MUL represented in FIG. 3 multiplies the signal amplitudes of the signals F and K, so that the signal H is produced. With K=0, we have H=0. Thus in this case no part of the signal F is transferred. With the signal K = +1 a part of the signal F with the same polarity is transferred as the signal H and with the signal K = −1 a part of the signal F with the opposite polarity is transferred as the signal H. When the binary values of the signal B2, displaced by two pulse train periods T, are unequal, it is always true that the signal K=0, and no part of the signal F is transformed into the multiplicative signal H. When the two binary values of the signal B2, displaced by two pulse train periods T, both assume their value 0, the result is the signal K = −1 and a part of the signal F with reverse polarity is transformed into the signal H. When the two binary values of the signal B2, displaced by two pulse train periods T, assume their value 1, a part of the signal F with the same polarity is transformed into the signal H. Since the signal H is to influence the pulse train phase regulation, no parts of the signal F are taken into account when two binary values of the signal B, displaced by two pulse train periods, differ from one another. In contrast, however, the pulse train phase regulation is influenced whenever the two binary values of the signal B2, displaced by two pulse train periods, both assume either the value 0 or the value 1.

Like the signal D, the signal F also signals the deviation $b$ of the receiving-end composite signal A2 from the mean theoretical amplitude $s2$. Since only with the deviations $b$ are of concern, it is immaterial whether the signal D or the signal F is multiplied by the signal K to obtain the multiplicative signal H.

The pulse train phase regulating stage TAR2 illustrated in FIG. 3 requies the theoretical value generator SWG and the difference stage DIF in addition to the circuitry used in the pulse train phase regulating stage TAR1 illustrated in FIG. 2. This additional expense is in practice generally inconsiderable, as the theoretical value generator SWG and the difference stage DIF might be required, as well, for other purposes.

The production and use of the signals K, L, M represented in FIG. 8 have already been explained making reference to FIGS. 2 and 7. In both cases of FIGS. 2 and 3, thus the same timing signal T2 is obtained.

FIG. 9 shows an exemplary embodiment of the coder CD used in the FIGS. 2 and 3 embodiments and comprising a delay stage VST, a NOT-equivalence gate G10, and AND-gate G11, a NOR-gate G12 and a signal generator SG. The delay stage VST can, for example, comprise a 2-stage shift register to effect a delay of two pulse train periods T, so that at the input and the output of this delay stage arise binary values of the signal B2 which are displaced by two pulse train periods T. If these two binary values differ from one another, a control signal is emitted from the output of gate G10 and is assigned to the amplitude stage 0 of the signal K. If the two binary values are equal to the value 1, then gate G11 emits a signal which indicates the amplitude stage +1 of the signal K. If the two binary values are both 0-values, a signal indicating the amplitude stage −1 of the signal K is emitted via the output of the gate G12. In dependence upon which of the control lines serves to feed a signal to the signal generator SG, this signal generator produces the signal K.

FIG. 10 shows the pulse generator TGE1 which can be used to perform the functions of the pulse generator TGE in the FIGS. 2 and 3 embodiments. An oscillator signal Q from the quarts crystal-controlled generator QG illustrated in FIG. 1 is coupled to the adder stage AUS in which in the presence of the signal M=0 individual pulses of the signal Q are suppressed and in which in the presence of the signal M=1 individual pulses are added to the signal Q. The output signal of this stage AUS is coupled to the frequency divider FT1 from the output of which the timing signal T2 is emitted.

FIG. 11 shows the pulse generator TGE2 which could also be used to perform the functions of the pulse generators TGE illustrated in FIGS. 2 and 3. The division ratio of the frequency divider FT2 can be changed in dependence upon the signal M in such manner that with the signal M=0 the phase state is delayed and with the signal M=1 the phase state is advanced. The output of the frequency divider FT2 is connected to the frequency divider FT3 which has an unvariable division ratio and which produces the timing signal T2.

The method in accordance with this invention is described by describing the construction and operation of alternative forms of a preferred embodiment constructed to function according to the principles of the invention. It is to be understood that the described embodiments can be modified or changed in construction, operation or waveforms produced in a number of ways known to those skilled in the art without departing from the scope of the invention as defined by the appended claims.

I claim:

1. A method of regulating the phase of timing signals in a data transmission system comprising the steps of:
   producing from a data signal to be transmitted, a transmitted composite signal containing partial response pulses having amplitudes which, at predetermined sampling time, deviate from predetermined positive, negative or mean amplitudes,
   generating, at a receiver, a sampling signal having amplitudes corresponding to the deviations of the amplitudes of said transmitted composite signal from said predetermined mean amplitude,
   generating a received data signal by decoding the sampling signal,
   delaying the received data signal by two pulse train periods,
   gating the combination of the received data signal and the delayed data signal to produce a fator signal having amplitudes representing the binary values 0, −1 and +1 corresponding, respectively, to when the binary values of the received data signal and the delayed data signal differ from one another, are of the same first binary value and are of the same second binary value,
   multiplying the amplitudes of said sampling signal and said factor signal to produce a multiplicative signal,
   integrating said multiplicative signal and deriving therefrom a regulating signal, and
   regulating the phase of said timing signal response to the value of said regulating signal.

2. The method defined in claim 1 wherein the regulating signal is derived from said integrated signal by the following additional steps:
   deriving from said integrated signal a sign signal indicating the polarity of said integrated signal, said sign signal being used as the regulating signal.

* * * * *